(12) United States Patent
Kinoshita et al.

(10) Patent No.: US 6,747,937 B2
(45) Date of Patent: Jun. 8, 2004

(54) PLAYBACK MECHANISM OF RECORDING MEDIUM

(75) Inventors: Hideki Kinoshita, Kawagoe (JP); Jun Togashi, Kawagoe (JP); Nobutaka Sawada, Kawagoe (JP); Takashi Mizoguchi, Kawagoe (JP); Akira Yasaki, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 160 days.

(21) Appl. No.: 10/127,422

(22) Filed: Apr. 23, 2002

(65) Prior Publication Data

US 2002/0159372 A1 Oct. 31, 2002

(30) Foreign Application Priority Data

Apr. 27, 2001 (JP) ........................................ 2001-130744

(51) Int. Cl.[7] .............................................. G11B 33/02
(52) U.S. Cl. ...................................................... 369/77.1
(58) Field of Search ................................ 369/77.1, 77.2

(56) References Cited

U.S. PATENT DOCUMENTS 5,719,844 A * 2/1998 Abe .......................... 369/77.1
6,414,929 B1 * 7/2002 Fujiwara ..................... 369/77.1

FOREIGN PATENT DOCUMENTS

EP 0 557 975 A2 9/1993
EP 1 035 541 A1 9/2000

* cited by examiner

Primary Examiner—George J. Letscher

(57) ABSTRACT

A playback mechanism of a recording medium is provided, by which a period of time required until information recorded in the recording medium is read out after the recording medium is inserted in an instrument body can be shortened and the size of the playback mechanism can be reduced. The mechanism includes an instrument body, conveying unit having a roller arm and disc guide, clamp playback unit having a locking pin, and locking member. The clamp playback unit is movable relatively to the instrument body. The locking member locks the locking pin to fix the clamp playback unit. The locking member releases the locking of the locking pin to make the clamp playback unit movable relatively to the instrument body. When the clamp playback unit clamps a CD, the roller arm and disc guide part from the CD, thereby the locking by the locking member is gradually released.

7 Claims, 11 Drawing Sheets

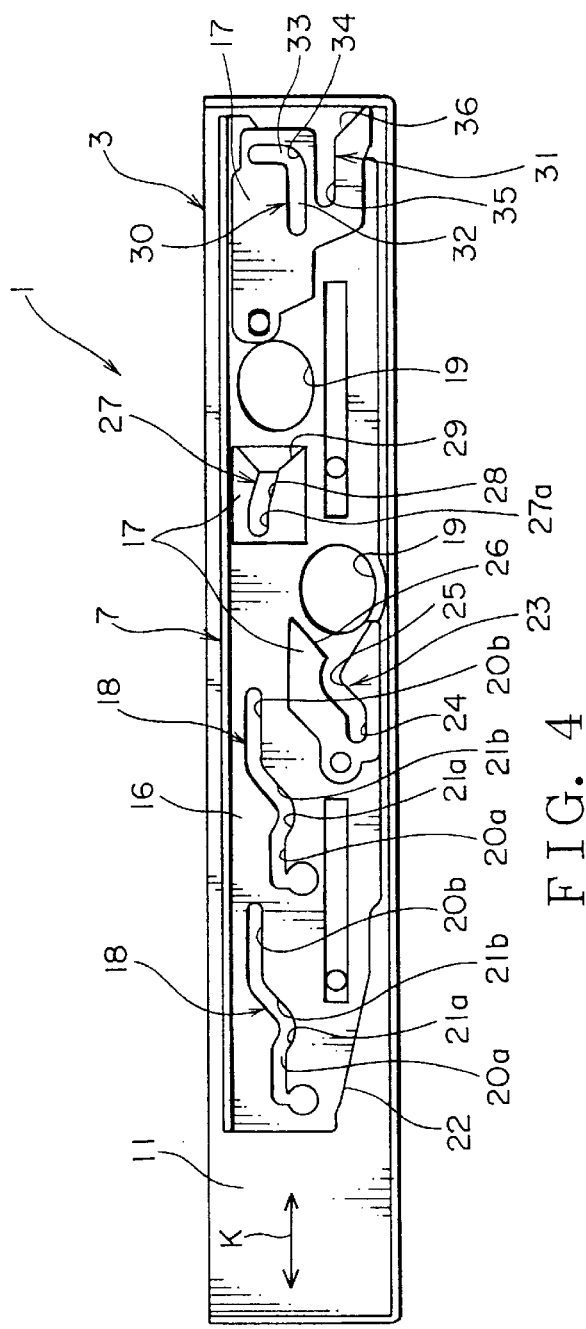
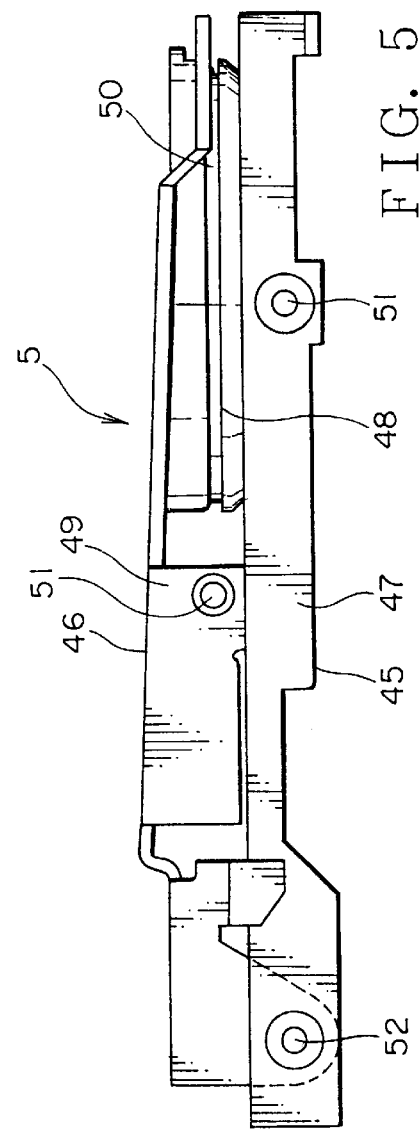

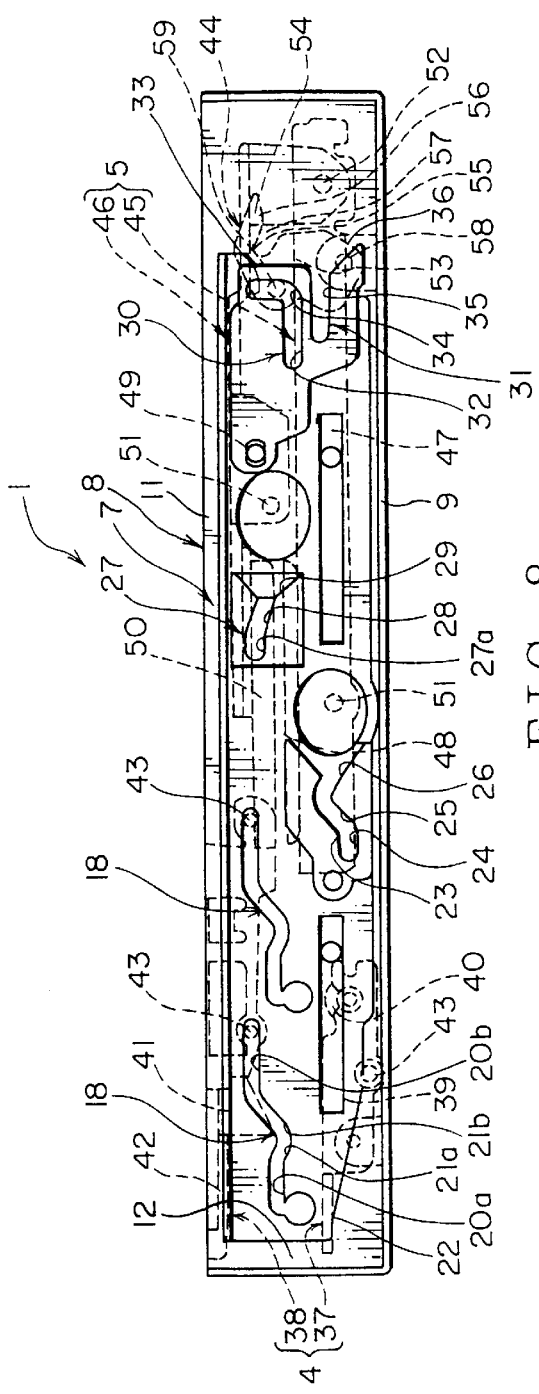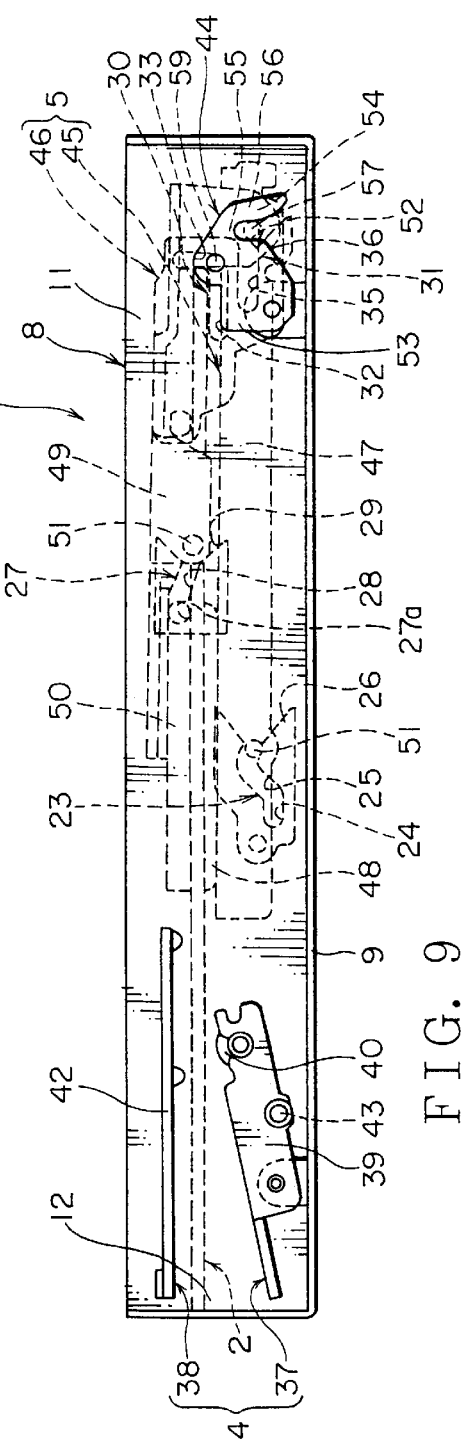
FIG. 8
FIG. 9

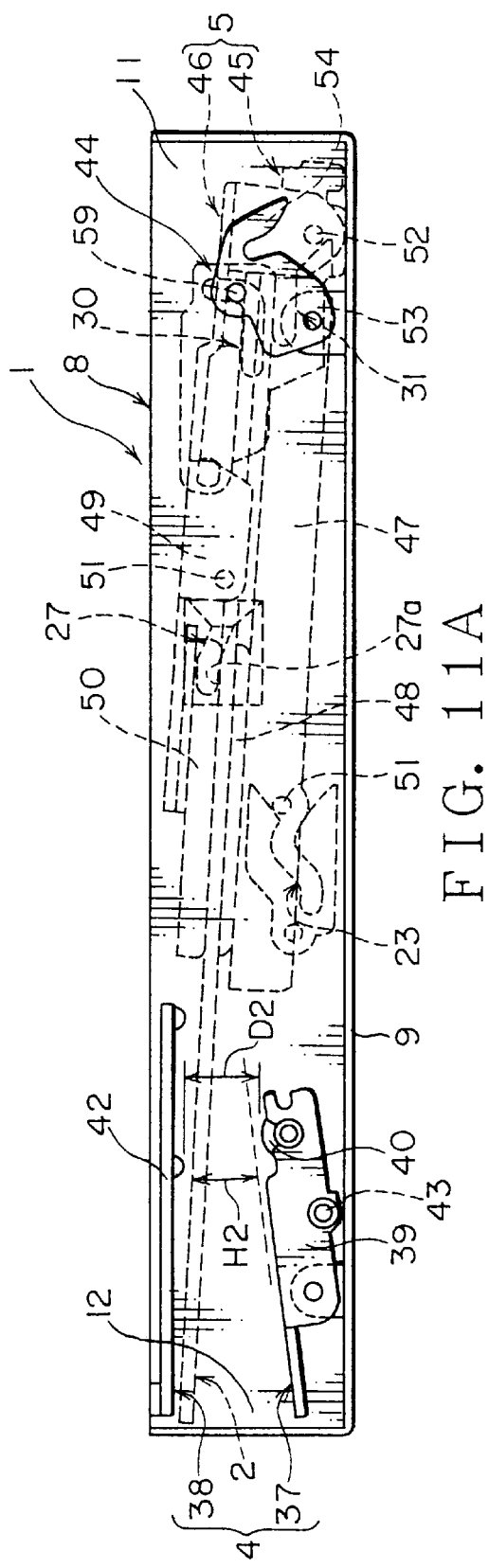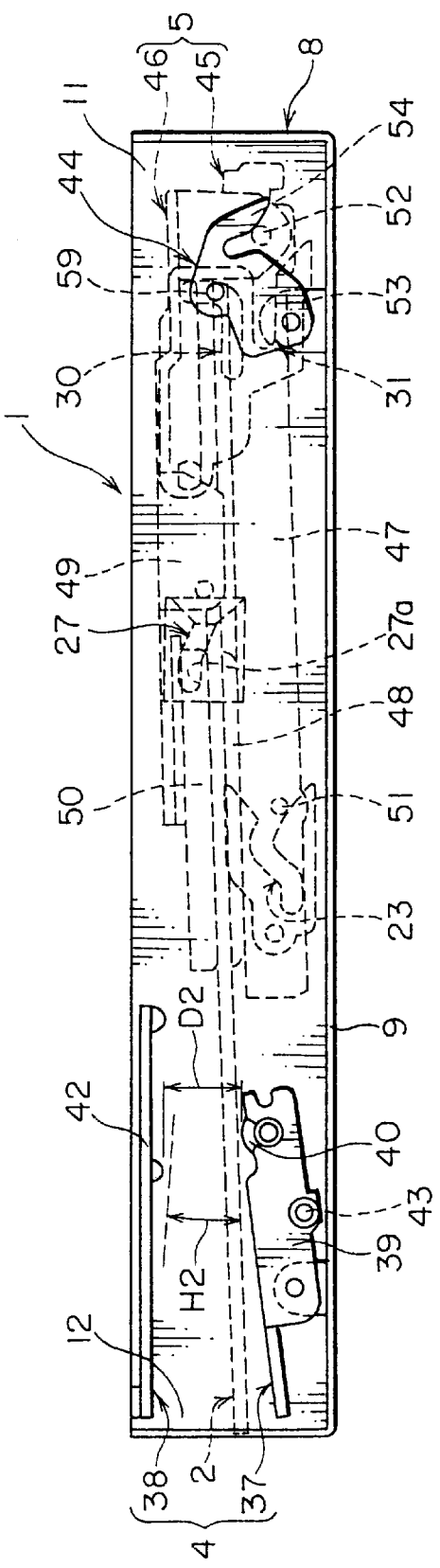
FIG. 11A
FIG. 11B

PLAYBACK MECHANISM OF RECORDING MEDIUM

BACKGROUND OF THE INVENTION (1) Field of the Invention

The present invention relates to a playback mechanism of a recording medium, which reads out information from a recording medium such as a compact disc.

(2) Description of the Related Art

A compact disc (hereinafter, CD) is an example of a recording medium. A CD player as a playback mechanism of a recording medium is mounted on an instrument panel of a motor vehicle as a mobile unit. The CD player reads out the information recorded in the CD.

The CD player is provided with an instrument body to be mounted on the instrument panel, an opening for inserting the recording medium opened to the instrument body, a conveying unit, clamp playback mechanism, locking member, and so on. The instrument body is formed in a box-shape, in which a plurality of metal plates are assembled to each other. The CD is inserted through the opening for inserting the recording medium.

The conveying unit conveys the CD inserted through the opening for inserting the recording medium up to the clamp playback mechanism or conveys the CD from the clamp playback mechanism to the opening for inserting the recording medium, thereby taking the CD out from the inside of the instrument body. The conveying unit is provided with a pair of first nipping members formed separable from each other.

One member of the pair of the first nipping members has a conveying roller rotatively driven by a drive source such as a motor. The conveying roller is rotatively driven by a drive source such as a motor, thereby conveying the CD. The another member of the pair of the first nipping members has a sliding member having a small friction coefficient. The sliding member nips the CD between the sliding member and the conveying roller so as to guide the CD in the conveying direction. The conveying unit nips the CD between the pair of the first nipping members and conveys the CD.

The clamp playback mechanism has a pair of second nipping members formed separable from each other. One member of the pair of the second nipping members has a rotary table rotatively driven by a drive source such as a motor and an optical pickup for reading out the information recorded in the CD. The rotary table rotates the CD after the CD is set on the rotary table by using a central hole to position the CD.

The another member of the pair of the second nipping members is provided with a disc-shaped clamper at a position where the another member meets the rotary table. The clamper is formed rotatably relatively to the another member. When the pair of the second nipping members approaches each other, they nip the CD between the rotary table and the clamper. The clamp playback mechanism clamps the CD by nipping the CD between the pair of the second nipping members. Thereafter, the optical pickup of the clamp playback mechanism reads out the information recorded in the CD.

The clamp playback mechanism is movably supported relatively to the instrument body by a coil spring or rubber. Since the playback mechanism of a recording medium is mounted on the motor vehicle and the like, the instrument body oscillates due to the oscillation of the vehicle during traveling. Then, the clamp playback mechanism moves relatively to the instrument body by the coil spring or rubber. Thus, the influence of the oscillation is reduced when the clamp playback mechanism reads out the information recorded in the CD.

The locking member is rotatably provided in the instrument body or the like. The locking member moves in the range between a locking position where a part of the clamp playback mechanism is locked and a lock-releasing position where the locking is released. At the position where the locking member locks the part of the clamp playback mechanism, the clamp playback mechanism is fixed relatively to the instrument body. At the lock-releasing position, the clamp playback mechanism becomes free relatively to the instrument body.

In the playback mechanism of a recording medium as mentioned above, when the CD is inserted from the opening for inserting the recording medium, the playback mechanism nips the CD between the pair of the first nipping members and conveys the CD toward the pair of the second nipping members of the clamp playback mechanism. At this time, the second nipping members part from each other. When the CD is situated between the pair of the second nipping members, the second nipping members approach to each other while the first nipping members part from each other. Then, the CD is clamped to the clamp playback mechanism. At this time, the locking member is situated at the locking position and the clamp playback mechanism is fixed relatively to the instrument body.

Then, the pair of the first nipping members parts from each other. When the clamp playback mechanism moves relatively to the instrument body, the CD clamped to the clamp playback mechanism is prevented from coming into contact with the pair of the first nipping members. Thus, the pair of the first nipping members parts from each other, thereby securing a range within which the CD can move when the clamp playback mechanism moves relatively to the instrument body.

After the pair of the first nipping members sufficiently part from each other, the locking member moves from the locking position to the lock-releasing position. When the locking member is situated at the lock-releasing position, the rotary table rotates and the information recorded in the CD can be read out through the optical pickup. The information taken out through the optical pickup is output as a voice through a speaker and the like equipped in the motor vehicle.

In the playback mechanism of a recording medium, when the CD is taken out from the instrument body, first the rotation of the rotary table is halted. Then, the locking member is moved from the lock-releasing position to the locking position, thereby the clamp playback mechanism is fixed relatively to the instrument body. Thereafter, the pair of the second nipping members parts from each other while the pair of the first nipping members approach to each other. With nipping the CD between the pair of the first nipping members, the conveying unit conveys the CD to the opening for inserting the recording medium. The CD is taken out from the instrument body through the opening.

As is mentioned above, in a conventional playback mechanism of a recording medium, in order to prevent a problem from taking place, the problem being that the clamp playback mechanism or the CD comes into contact with the pair of the first nipping members of the conveying unit due to the oscillation of the motor vehicle during traveling, a clearance between the pair of the first nipping members and the clamp playback mechanism has been sufficiently secured and thereafter the lock by the locking member has been released.

Accordingly, since the lock by the locking member is released after the pair of the first nipping members sufficiently parts from each other, therefore it takes a long period of time to start the playback of the recording medium after the recording medium such as the CD is inserted in the instrument body. In such a case, a long period of time elapses until the information recorded in the recording medium is output as a voice after the recording medium is inserted in the instrument body, thereby giving a passenger in the motor vehicle an unpleasant feeling. Further, in order to release the lock of the locking member after the clearance between the pair of the first nipping members and the clamp playback mechanism is sufficiently secured, a mechanism for securing the clearance and that for releasing the lock should be separately provided, resulting in that the number of parts increases and the playback mechanism itself becomes large in size.

SUMMARY OF THE INVENTION

It is therefore an objective of the present invention to solve the above problem and to provide a playback mechanism of a recording medium, by which a period of time required until the information recorded in the recording medium is read out after the recording medium is inserted in the instrument body can be shortened and the size of the playback mechanism can be reduced.

In order to attain the above objective, the present invention is to provide a playback mechanism of a recording medium comprising:

- a pair of nipping devices for nipping the recording medium and conveying the recording medium into an instrument body;
- a clamp playback device for clamping the recording medium conveyed into the instrument body and reading out information recorded in the recording medium;
- a locking device for locking the clamp playback device relatively to be instrument body, the locking device being movable within a range between a locking position where the clamp playback device is fixed relatively to the instrument body and a lock-releasing position where the clamp playback device is movable relatively to the instrument body; and
- a cooperation device for gradually parting each of the pair of the nipping devices from the recording medium when the clamp playback device clamps the recording medium conveyed by the pair of the nipping devices, and for gradually shifting the locking device from the locking position to the lock-releasing position so that the clamp playback device becomes movable relatively to the instrument body in response to a movable range of the recording medium, the movable range being formed due to that each of the pair of the nipping devices gradually parts from the recording medium.

With the construction described above, the locking device gradually moves from the locking position to the lock-releasing position while each of the pair of the nipping devices parts from the recording medium. Therefore, a period of time required until the information recorded in the recording medium is read out after the recording medium is inserted in the instrument body can be shortened.

Further, the locking device moves from the locking position to the lock-releasing position in response to a movable range of the recording medium, which is formed due to that each of the pair of the nipping devices gradually parts from the recording medium. That is, the cooperation device gradually parts each of the pair of the nipping devices from the recording-medium so as to prevent the recording medium from coming into contact with the pair of the nipping-devices and causes the locking device to gradually move from the locking position to the lock-releasing position.

Accordingly, even if the clamp playback device oscillates relatively to the instrument body by an oscillation and the like while the locking device moves from the locking position to the lock-releasing position, the recording medium clamped by the clamp playback device does not come into contact with the pair of the nipping devices. Further, since the cooperation device successively causes two actions, that is, to part each of the pair of the nipping devices from the recording medium and to shift the locking device to the lock-releasing position, therefore the playback mechanism itself can be miniaturized.

Preferably, the locking device comprises:

- a locking pin provided at the clamp playback device; and
- a locking member provided in the instrument body for locking the locking pin, the cooperation device comprises:

- a sliding member slidably provided in the instrument body;
- a first projecting pin provided at each of the pair of the nipping devices; and
- a second projecting pin provided at the locking member, and the sliding member comprises:
  - a guiding hole for receiving the first projecting pin of one nipping device out of the pair of the nipping devices;
  - a guiding inclined surface coming into contact with the first projecting pin of an opposite nipping device out of the pair of the nipping devices; and
  - a locking-guide groove for receiving the second projecting pin, wherein when the sliding member slidably moves relatively to the instrument body, each of the first projecting pins moves along the guiding hole and the guiding inclined surface, each of the pair of the nipping devices gradually parts from the recording medium, and the second projecting pin moves along the locking-guide groove in response to the movement of the first projecting pins, thereby the locking of the locking pin by the locking member is gradually released.

With the construction described above, when the sliding member slides, each of the pair of the first projecting pins is moved along the guiding hole and the guiding inclined surface, so that each of the pair of the nipping devices of the conveying device gradually parts from the recording medium. Further, in response to the movement of the first projecting pin, the second projecting pin moves along the locking-guide groove, so that the locking by the locking member is gradually released. Therefore, a period of time required until the information recorded in the recording medium is read out after the recording medium is inserted in the instrument body can be shortened. Further, since the cooperation device successively causes two actions, that is, to part each of the pair of the nipping devices from the recording medium by sliding the sliding member and to shift the locking device to the lock-releasing position, therefore the playback mechanism itself can be miniaturized.

Preferably, the locking device further comprises a locking concave groove provided at the sliding member for receiving the locking pin, and the cooperation device further comprises a third projecting pin provided at the clamp playback device, the sliding member further comprises a guiding groove for receiving the third projecting pin, and the guiding groove has a first expanding part, an area of which gradually expands in the sliding direction of the sliding member, while the locking concave groove has a second expanding part, an area of which gradually expands in the sliding direction of the sliding member, as the sliding member slidably moves relatively to the instrument body and the locking of the locking pin by the locking member is gradually released, a movable range of the locking pin within an area defined by the second expanding part and the locking member is gradually expanded while a movable range of the third projecting pin within an area of the first expanding part is gradually expanded, thereby a movable range of the clamp playback device relative to the instrument body is gradually expanded.

With the construction described above, as the sliding member slidably moves and the locking of the locking pin by the locking member is gradually released, a movable range of the locking pin is gradually expanded. Further, the movable range of the third projecting pin gradually expanded. Therefore, since the movable range of the clamp playback device is gradually expanded as each of the pair of the nipping devices parts from the recording medium, a period of time required until the information recorded in the recording medium is read out after the recording medium is inserted in the instrument body can be shortened.

Preferably, at the lock-releasing position, the third projecting pin and the locking pin come out from the first expanding part of the guiding groove and the second expanding part of the locking concave groove, respectively, and the locking of the locking pin by the locking member is completely released.

With the construction described above, at the lock-releasing position, the third projecting pin securely comes out from the guiding groove. Further, the locking pin comes out from the locking concave groove and the locking of the locking pin by the locking member is released. Therefore, the clamp playback device can be securely movable relative to the instrument body at the lock-releasing position.

Preferably, the locking member includes a hook for locking the locking pin and the hook extends in a direction intersecting the sliding direction of the sliding member at the locking position.

With the construction described above, the locking concave groove, into which the locking pin enters, extends in the sliding direction of the sliding member at the locking position. Further, the hook of the locking member, which locks the locking pin, extends in a direction intersecting the sliding direction of the sliding member at the locking position.

Consequently, at the locking position, the locking pin is prevented from shifting in a direction intersecting the sliding direction of the sliding member by the locking concave groove and prevented from shifting in the sliding direction of the sliding member by the hook. Therefore, the clamp playback device is securely fixed to the instrument body at the locking position.

Preferably, the locking-guide groove includes a slide extending part extending in the sliding direction of the sliding member and an intersection extending part extending in the direction intersecting the sliding direction of the sliding member, the second projecting pin is situated at the slide extending part while the pair of the nipping devices conveys the recording medium and situated at an intersection where the slide extending part and the intersection extending part intersect each other when the clamp playback device clamps the recording medium, and the locking device shifts from the locking position to the lock-releasing position passing through the inside of the intersection extending part when each of the pair of the nipping devices gradually parts from the recording medium.

With the construction described above, while the recording medium is conveyed, the second projecting pin projecting from the locking member is situated within the slide extending part of the locking-guide groove along the sliding direction of the sliding member. Therefore, the locking member maintains a state that the hook locks the locking pin while the conveying device conveys the recording medium.

When the sliding member slides, the second projecting pin is situated at an intersection where the slide extending part and the intersection extending part, which extends in a direction intersecting the slide extending part, intersect each other. Further, when each of the pair of the nipping devices gradually parts from the recording medium, the second projecting pin passes through the intersection extending part. Consequently, when the sliding member slides and each of the pair of the nipping devices gradually parts from the recording medium, the locking member securely rotates in such a direction that the locking of the locking pin by the hook is released.

BRIEF DESCRIPTION OF THE DRAWINGS

FIG. 4 is a front view illustrating a sliding member and so on of the playback mechanism of a recording medium shown in FIG. 1;

FIG. 5 is a side view illustrating a clamp playback unit of the playback mechanism of a recording medium shown in FIG. 1;

FIG. 8 is a view of the playback mechanism of a recording medium shown in FIG. 1 viewed from a side thereof illustrating a state that a locking member shifts to the lock-releasing position;

FIG. 9 is another view of the playback mechanism of a recording medium shown in FIG. 1 viewed from a side thereof illustrating a state that the clamp playback unit clamps the CD;

FIGS. 11A and 11B are a view of the playback mechanism of a recording medium shown in FIG. 1 viewed from a side thereof illustrating another process that the locking member shifts from the locking position to the lock-releasing position;

DESCRIPTION OF THE PREFERRED EMBODIMENTS

Figure 1:
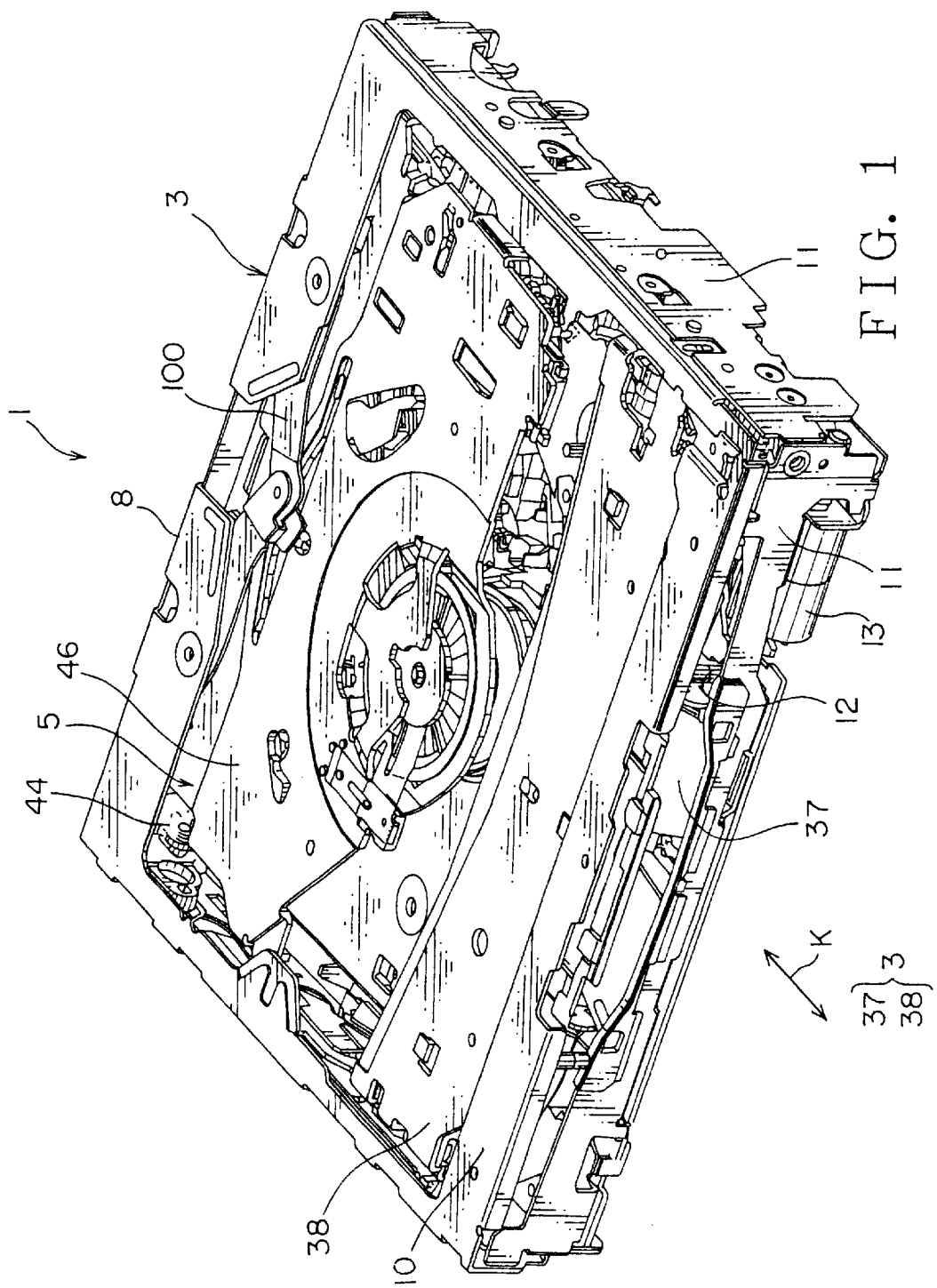
FIG. 1 is a perspective view illustrating a playback mechanism of a recording medium according to a preferred embodiment of the present invention.

In the following, a playback mechanism 1 of a recording medium according to a preferred embodiment of the present invention will be explained with reference to FIGS. 1–17. The playback mechanism 1 shown in FIG. 1 is mounted on, for example, an instrument panel of a motor vehicle as a mobile unit. The playback mechanism 1 receives a CD 2 (shown in FIGS. 9–17) as a recording medium, takes out (plays back) information recorded in the CD 2, and outputs the information as a voice.

As shown in FIG. 1, the playback mechanism 1 includes an instrument body 3, a conveying unit 4 (shown in FIGS. 4–17), a clamp playback unit 5 as a clamp playback device, and a pair of locking members 44 (shown in FIGS. 6–12).

The instrument body 3 includes a chassis 8 (shown in FIGS. 2 and 3), a driving source unit 6 (shown in FIG. 3), and a pair of sliding members 7 (one of the members being shown in FIG. 4). The chassis 8 consists of a plurality of metal plates assembled to each other and formed in a flat box-shape with the metal plates being bent.

Figure 2:
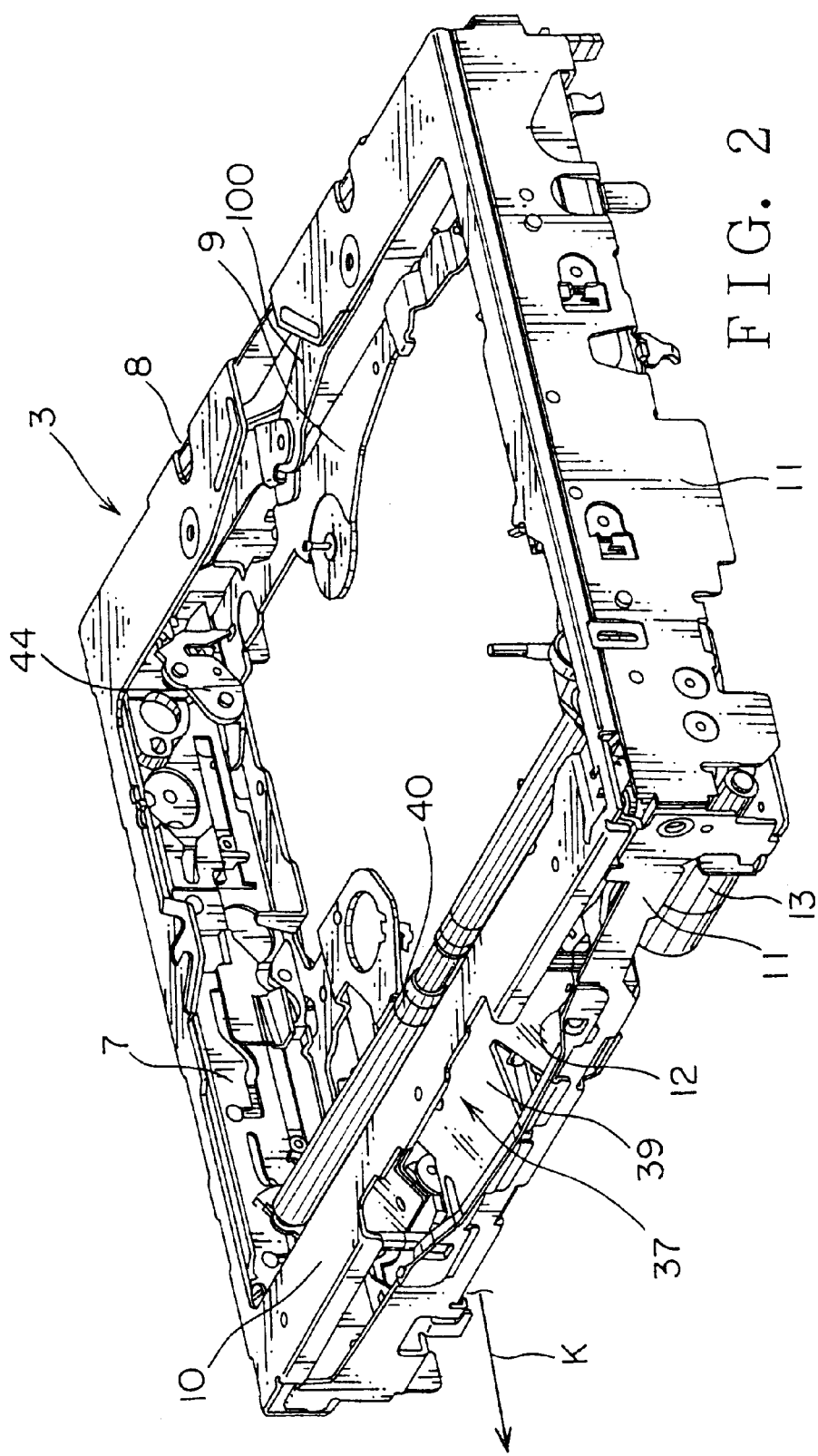
FIG. 2 is a perspective view illustrating an instrument body of the playback mechanism of a recording medium shown in FIG. 1.
Figure 3:
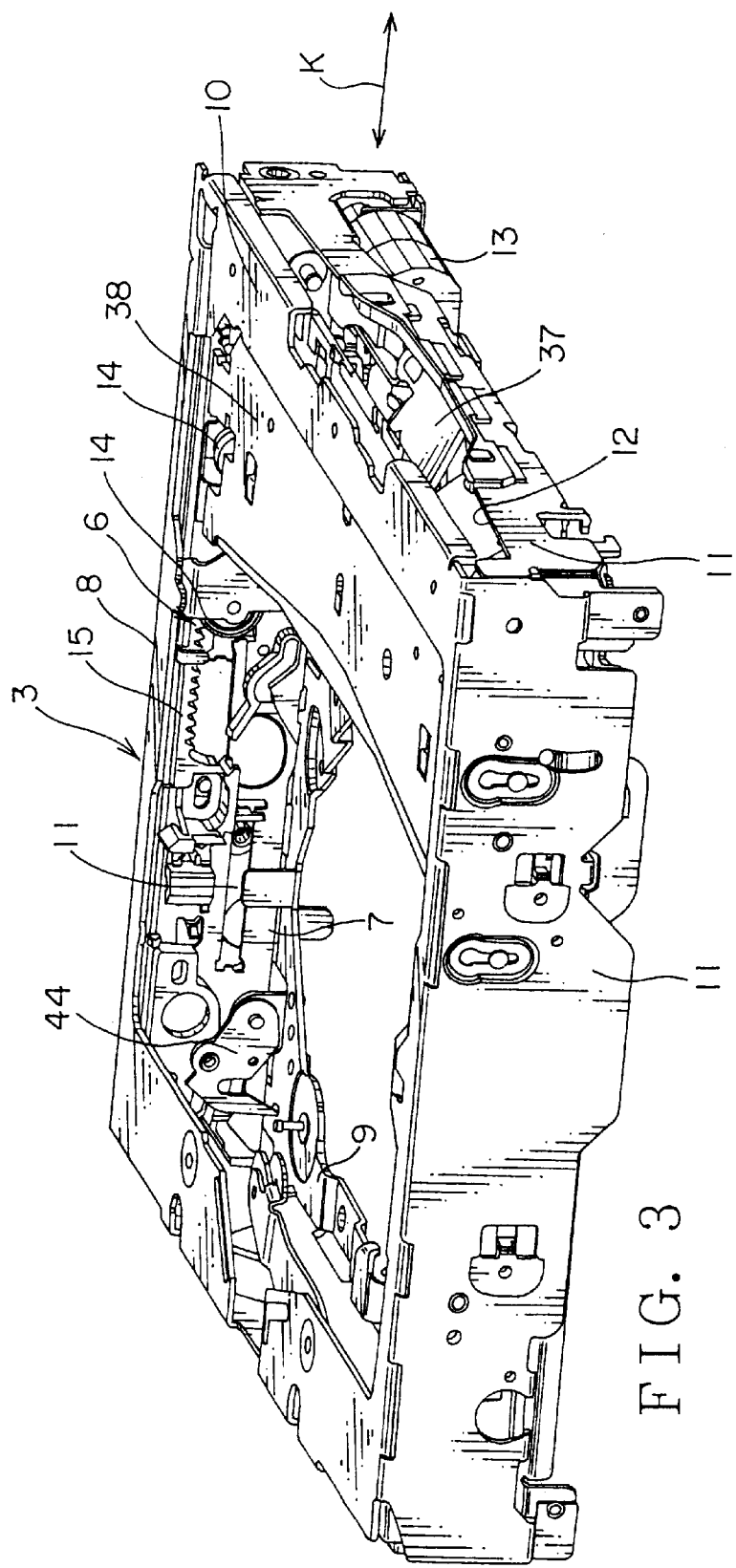
FIG. 3 is a perspective view illustrating an instrument body of the playback mechanism of a recording medium shown in FIG. 1 viewed from another direction.

As shown in FIGS. 2 and 3, chassis 8 consists of a flat bottom wall 9, a top wall 10 facing the bottom wall 9 having a space therebetween, and a plurality of side walls 11 continuing to the bottom wall 9 and top wall 10. These walls 9, 10 and 11 are provided with a plurality of openings to secure the lightness and stiffness of the chassis 8.

One side wall 11 situated at this side in FIG. 1 out of the plurality of side walls 11 is provided with an opening 12 for inserting the recording medium, which penetrates through the one side wall 11 and can let the CD 2 pass through toward the inside in a direction of an arrow K shown in FIG. 1. Through the opening 12, the CD 2 is received into or taken out from the instrument body 3.

The driving source unit 6 is mounted in the vicinity of another side wall 11 (situated at the center depths in FIG. 3), which continues to the one side wall 11 on which the opening 12 is formed. As shown in FIG. 3, the driving source unit 6 includes a motor 13 as a driving source and a plurality of gears 14. The motor 13 is mounted on the chassis 8. The motor 13 corresponds to the driving source of the conveying unit 4 described in this specification.

An output shaft of the motor 13 is provided with a pinion (not shown). Each gear 14 is rotatably supported by the side wall 11 and so on. These gears 14 engage with each other. One gear 14 out of these gears 14 engages with the pinion.

A pair of the sliding members 7 is mounted on a pair of the side walls 11, which continues to the one side wall 11 on which the opening 12 is formed. The sliding member 7 is slidably mounted on the side wall 11 along-the arrow K. That is, the sliding member 7 is slidable along the inserting and taking-out direction of the CD 2.

One sliding member 7 situated at the center depths in FIG. 3 out of the pair of the sliding members 7 is provided with a rack 15. When the CD 2 is inserted into the instrument body 3 through the opening 12, the rack 15 is pushed toward the one side wall 11 on which the opening 12 is formed by a seesaw member (not shown).

When the rack 15 is pushed toward the one side wall 11 by the seesaw member, the rack 15 engages with a gear 14. The pair of the sliding members 7 synchronously slides relatively to the side wall 11 by a link 100 (shown in FIG. 1). That is, each of the pair of the sliding members 7 simultaneously approaches or leaves the opening.

As shown in FIG. 4, the sliding member 7 mounted on the side wall 11 situated at the depths in FIG. 2 has a metal plate part 16 and synthetic resin part 17. The metal plate part 16 is formed in a band plate-shape and supported by the side wall 11 slidably along the arrow K shown in FIG. 4. The length direction of the metal plate part 16 runs parallel to the length direction of the side wall 11.

The synthetic resin part 17 is made of synthetic resin having a small friction coefficient and formed in a rectangular shape. The three synthetic resin parts 17 are mounted on the metal plate part 16. Each synthetic resin part 17 is provided at the center of the metal plate part 16 in the length direction thereof, at an end of the metal plate part 16 situated away from the opening 12, and between the center and the end of the metal plate part 16.

The metal plate part 16 has a pair of guiding holes 18 and a pair of holes 19. These holes 18 and 19 penetrate through the metal plate part 16. The pair of the guiding holes 18 are formed at an end of the metal plate part 16 near to the opening 12 and arranged having a distance therebetween along the length direction of the metal plate part 16.

Each guiding hole 18 has a pair of horizontal extending parts 20a and 20b and a pair of inclined extending parts 21a and 21b. The guiding hole 18 has one horizontal extending part 20a, one inclined extending part 21a, another inclined extending part 21b, and another horizontal extending part 20b in sequence starting from the opening 12-side. These one horizontal extending part 20a, one inclined extending part 21a, another inclined extending part 21b, and another horizontal extending part 20b are arranged in series.

Both of the horizontal extending parts 20a and 20b extend along the length direction of the metal plate part 16, that is, the sliding direction (arrow K) of the sliding member 7. The one horizontal extending part 20a is arranged below the another horizontal extending part 20b in FIG. 4. Both of the inclined extending parts 21a and 21b extend along a direction intersecting the length direction of the metal plate part 16, that is, a direction intersecting the sliding direction (arrow K) of the sliding member 7.

The one inclined extending part 21a gradually extends downward as leaving the one horizontal extending part 20a.

The another inclined extending part 21b gradually extends upward as leaving the one inclined extending part 21a and approaching the another horizontal extending part 20b.

The one hole 19 is formed between the synthetic resin part 17 provided at the center of the metal plate part 16 and the synthetic resin part 17 provided between the center and the end of the metal plate part 16, along the length direction of the metal plate part 16. The another hole 19 is formed between the synthetic resin part 17 provided between the center and the end of the metal plate part 16 and the synthetic resin part 17 provided at the end of the metal plate part 16, along the length direction of the metal plate part 16.

A guiding inclined surface 22 is formed at an end of the metal plate part 16 near to the opening 12 and is inclined relatively to the sliding direction of the sliding member 7 so as to gradually extend upward as approaching the opening 12.

The synthetic resin part 17 formed at the center of the metal plate part 16 is provided with a first guiding groove 23, which is formed to be concave from a surface situated inside the instrument body of the synthetic resin part 17. The first guiding groove 23 has a horizontal part 24, an upward inclined part 25 and an expanding part 26. The horizontal part 24, upward inclined part 25 and expanding part 26 are arranged along the sliding direction of the sliding member 7 in sequence as leaving the opening 12. The horizontal part 24, upward inclined part 25 and expanding part 26 continue to each other.

The horizontal part 24 extends along the sliding direction of the sliding member 7. The upward inclined part 25 is inclined relatively to the sliding direction of the sliding member 7 so as to gradually extend upward as leaving the horizontal part 24, that is, leaving the opening 12. The expanding part 26 is formed in such a manner that the width thereof in the direction intersecting the sliding direction of the sliding member 7 gradually increases as leaving the upward inclined part 25, that is, leaving the opening 12. The width of the end of the expanding part 26 parted from the opening 12 is about the same as that of the hole 19.

The synthetic resin part 17 provided between the center and the end of the metal plate part 16 is provided with a second guiding groove 27, which is formed to be concave from a surface situated inside the instrument body of the synthetic resin part 17. The second guiding groove 27 has a horizontal part 27a, a downward inclined part 28 and an expanding part 29. The horizontal part 27a, downward inclined part 28 and expanding part 29 are arranged along the sliding direction of the sliding member 7 in sequence as leaving the opening 12. The horizontal part 27a, downward inclined part 28 and expanding part 29 continue to each other.

The horizontal part 27a extends along the sliding direction of the sliding member 7. The downward inclined part 28 is inclined relatively to the sliding direction of the sliding member 7 so as to gradually extend downward as leaving the opening 12. The expanding part 29 is formed in such a manner that the width thereof in the direction intersecting the sliding direction of the sliding member 7 gradually increases as leaving the downward inclined part 28, that is, leaving the opening 12. The width of the end of the expanding part 29 parted from the opening 12 is about the same as that of the hole 19. The first and second guiding grooves 23 and 27, respectively, correspond to the guiding groove described in the claim. The expanding parts 26 and 29 correspond to the first expanding part described in the claim.

The synthetic resin part 17 formed at the end of the metal plate part 16 is provided with a locking-guide groove 30 and a locking concave groove 31, which are formed to be concave from a surface situated inside the instrument body 3 of the synthetic resin part 17. The locking-guide groove 30 is formed above the locking concave groove 31 and has a slide extending part 32 and an intersection extending part 33.

The slide extending part 32 and intersection extending part 33 are arranged along the sliding direction of the sliding member 7 in sequence leaving from the opening 12. The slide extending part 32 and the intersection extending part 33 continue to each other.

The slide extending part 32 extends along the sliding direction of the sliding member 7. The intersection extending part 33 extends upward from the slide extending part 32. Thus, the intersection extending part 33 extends along a direction intersecting the sliding direction from the slide extending part 32. A point where the slide extending part 32 and the intersection extending part 33 intersect each other is an intersection 34.

The locking concave groove 31 has a horizontal extending part 35 and a second expanding part 36. The horizontal extending part 35 and the second expanding part 36 are arranged along the sliding direction of the sliding member 7 in sequence as leaving the opening 12. The horizontal extending part 35 and the second expanding part 36 continue to each other.

The horizontal extending part 35 extends along the sliding direction of the sliding member 7. The second expanding part 36 is formed in such a manner that the width thereof in the direction intersecting the sliding direction of the sliding member 7 gradually increases as leaving the horizontal extending part 35, that is, leaving the opening 12.

The metal plate part 16 is provided with a pair of guiding holes 18, a pair of holes 19, and a guiding inclined surface 22. The synthetic resin part 17 is provided with a first guiding groove 23, a second guiding groove 27, a locking-guide groove 30, and a locking concave groove 31. Consequently, the sliding member 7 is provided with the pair of the guiding holes 18, the pair of the holes 19, the guiding inclined surface 22, the first guiding groove 23, the second guiding groove 27, the locking-guide groove 30, and the locking concave groove 31.

As shown in FIGS. 6–12, the conveying unit 4 has a roller arm 37 and a disc guide 38. The roller arm 37 is disposed in the vicinity of the opening 12. The roller arm 37 has an arm body 39 made of a metal plate and a roller 40.

The arm body 39 is formed in a band-shape with the length direction thereof extending along the width direction of the chassis 8. The arm body 39 is supported by the bottom wall 9 rotatably around one edge thereof in the width direction thereof. The rotation center of the arm body 39 runs parallel to the width direction of the chassis 8. The arm body 39 is biased by a coil spring (not shown) in a direction that another edge thereof in the width direction thereof leaves the bottom wall 9.

The roller 40 is rotatably supported by the another edge of the arm body 39. The rotation center of the roller 40 runs parallel to the width direction of the chassis 8. One end of the roller 40 is provided with a gear (not shown). The gear of the roller 40 engages with one gear 14 out of the gears 14 of the driving source unit 6 in a state that the another edge of the arm body 39 is parted from the bottom wall 9. The roller 40 is rotated by the rotational driving force of the motor 13 through the gear 14.

The disc guide 38 includes a guide body 41 made of a metal plate and a gliding member 42 attached to the guide body 41. The guide body 41 is formed in a band-shape with the length direction thereof extending along the width direction of the chassis 8. The guide body 41 is supported by the chassis 8 slidably in a vertical direction with a first projecting pin 43 (explained later on) and a guiding hole 18 into which the first projecting pin 43 enters. The gliding member 42 is made of synthetic resin having a small friction coefficient and formed in a thin plate-shape. The gliding member 42 is attached to a surface situated inside the chassis 8 of the guide body 41.

The roller arm 37 and the disc guide 38 have a respective first projecting pin 43. The first projecting pin 43 of the roller arm 37 protrudes from an end in the width direction of the roller arm 37, which is situated in the depths in FIG. 1 or 2, toward the side wall 11 on which the sliding member 7 is mounted. The arm body 39 is biased by a coil spring (not shown), thereby the first projecting pin 43 of the roller arm 37 comes into contact with the guiding inclined surface 22 of the sliding member 7.

A pair of the first projecting pins 43 of the disc guide 38 is provided at an end in the width direction of the guide body 41, which is situated in the depths in FIG. 1 or 2, and another pair of the first projecting pins 43 of the disc guide 38 is provided at an end in the width direction of the guide body 41, which is situated at this side in FIG. 1 or 2. These first projecting pins 43 protrude from the guide body 41 toward the side wall 11. Each first projecting pin 43 of the disc guide 38 provided at an end in the width direction of the guide body 41, which is situated in the depths in FIG. 1 or 2, passes through the guiding hole 18.

The roller arm 37 and the disc guide 38 correspond to the nipping device described in the claim. That is, the conveying unit 4 has a pair of the nipping devices.

The clamp playback unit 5 includes a carriage chassis 45 and clamp arm 46. The carriage chassis 45 has a chassis body 47 made of a metal plate or the like, a rotary table 48 mounted on the chassis body 47, and an optical pickup part (not shown) mounted on the chassis body 47. The chassis body 47 is formed in a flat board-shape.

The rotary table 48 is rotatably supported by the chassis body 47. The rotary table 48 enters into a central hole of the CD 2. The rotary table 48 rotates the CD 2 by the driving force of a motor and the like. The optical pickup part includes an optical pickup for reading the information recorded in the CD 2, a driving mechanism to make the optical pickup approach or leave the rotary table 48 and so on.

The clamp arm 46 has an arm body 49 made of a metal plate or the like and a clamper 50. The arm body 49 is formed in a flat plate-shape and is supported by the chassis body 47 of the carriage chassis 45 rotatably around an end thereof, which is away from the opening 12. The rotation center of the arm body 49 runs parallel to the width direction of the chassis 8. When the arm body 49 approaches the chassis body 47, the chassis body 47 runs parallel to the arm body 49.

The clamper 50 is disposed at a position facing the rotary table 48. The clamper 50 is formed in a disc-shape and supported rotatably by the arm body 49. When the arm body 49 runs parallel to the chassis body 47, the clamper 50 can nip the CD 2 between the clamper 50 and the rotary table 48.

The clamp playback unit 5 is supported in the chassis 8 movably relatively to the instrument body 3 by a clamper made of an elastic body such as rubber and a coil spring. The clamp playback unit 5 nips the CD 2 between the rotary table 48 and the clamper 50, the rotary table 48 rotates the CD 2, and the optical pickup unit reads out the information recorded in the CD 2.

Even when the instrument body 3 oscillates due to the oscillation of the motor vehicle during traveling, the clamp playback unit 5 shifts relatively to the chassis 8 by the clamper and coil spring. Thus, the clamper and coil spring prevent the oscillation of the vehicle during traveling from affecting the readout action of the information recorded in the CD 2. As the locking of the locking pin 52 by the hook 54 is gradually released, the movable range of the clamp playback unit 5 relatively to the instrument body 3 gradually expands.

Each of the carriage chassis 45 and the clamp arm 46 has a third projecting pin 51. The third projecting pin 51 of the carriage chassis 45 protrudes from both ends of the chassis body 47 in the width direction, which is situated in the depths and at this side in FIGS. 1 and 2, toward the side wall 11. When the locking member 44 is situated at the locking position (explained later on), the third projecting pin 51 of the carriage chassis 45 enters into the first guiding groove 23. When the locking member 44 is situated at the lock-releasing position (explained later on), the third projecting pin 51 of the carriage chassis 45 comes out from the first guiding groove 23.

The third projecting pin 51 of the clamp arm 46 protrudes from an end of the arm body 49 in the width direction, which is situated in the depths in FIGS. 1 and 2, toward the side wall 11 on which the sliding member 7 is mounted. When the locking member 44 is situated at the locking position,- the third projecting pin 51 of the clamp arm 46 enters into the second guiding groove 27. When the locking member 44 is situated at the lock-releasing position, the third projecting pin 51 of the clamp arm 46 comes out from the second guiding groove 27.

The carriage chassis 45 further includes a locking pin 52, which protrudes from both ends of the chassis body 47 of the carriage chassis 45 toward the side wall 11 on which the sliding member 7 is mounted. The locking pin 52 is provided at the rotation center of the relative rotational motion between the arm body 49 and the chassis body 47. When the locking member 44 is situated at the locking position, the locking pin 52 enters into the locking concave groove 31. When the locking member 44 is situated at the lock-releasing position, the locking pin 52 comes out from the locking concave groove 31.

Each of the carriage chassis 45 and the clamp arm 46 corresponds to second nipping device. That is, the clamp playback unit 5 has a pair of the second nipping devices. The locking pin 52 protrudes from one of the second nipping devices.

Each locking member 44 is disposed in the vicinity of the side wall 11 on which the sliding member 7 is mounted. Each locking device 44 is disposed in the vicinity of the side wall 11, which faces the side wall 11 in which the opening 12 for inserting the recording medium is formed.

The locking member 44 is made of a thin metal plate and integrally includes a locking body 53 having a rectangular-shape in the plan view thereof, a hook 54 and a second projecting pin 59. The hook 54 includes a parting part 55 extending in a direction of leaving one outer edge of the locking body 53 and a parallel part 56 extending along the one outer edge from the parting part 55. Accordingly, the locking member 44 forms a slit 57 between the parallel part 56 and the locking body 53. The extending direction of the parallel part 56 corresponds to the extending direction of the hook 54 described in the claim. That is, the extending direction of the parallel part 56 intersects the sliding direction of the sliding member 7 at the locking position (explained later on).

The locking member 44 is supported by the bottom wall 9 rotatably around an end 58 staying away from the hook 54 of the locking body 53. By rotating around the end 58, the locking member 44 shifts within a range from the locking position where the locking pin 52 enters into the slit 57 shown in FIG. 6 so as to be locked by the hook 54 and the lock-releasing position where the locking pin 52 comes out from the slit 57 shown in FIG. 8 so as to release the locking of the locking pin 52 by the hook 54.

The second projecting pin 59 protrudes-from the locking body 53 toward the sliding member 7. The second projecting pin 59 enters into the locking-guide groove 30 within the range between the locking position and the lock-releasing position.

The sliding member 7, the first projecting pin 43, the third projecting pin 51 and the second projecting pin 59 constitute the cooperation device described in the claim. As is explained later on, the CD 2 conveyed by the roller arm 37 and the disc guide 38 is nipped by the carriage chassis 45 and the clamp arm 46.

The cooperation device thus constituted gradually parts the roller arm 37 and the disc guide 38 (away) from the CD 2 for preventing the CD 2 from coming into contact with the roller arm 37 and the disc guide 38 and causes the locking member 44 to gradually shift from the locking position to the lock-releasing position. That is, the cooperation device causes the locking device constituted by the locking member 44 and so on to gradually shift from the locking position to the lock-releasing position, in response to the movable range of the CD 2, which is formed when each of the roller arm 37 and the disc guide 38 gradually parts (away) from the CD 2.

Further, as the sliding member 7 slides relatively to the instrument body 3 and the locking of the locking pin 52 by the locking member 44 is gradually released, the movable range of the locking pin 52 within an area formed by the second expanding part 36 and the locking member 44 is gradually expanded, and furthermore, as the movable range of the third projecting pin 51 within an area of the expanding parts 26 and 29 is gradually expanded, the movable range of the clamp playback unit 5 relative to the instrument body 3 is gradually expanded.

The locking pin 52, the locking member 44 and the locking concave groove 31 constitute the locking device described in the claim. The locking device thus constituted can shift within the range between the locking position where the clamp playback unit 5 is fixed to the instrument body 3 and the lock-releasing position where the clamp playback unit 5 is set movable relatively to the instrument body 3.

The playback mechanism 1 of a recording medium constituted as described above clamps the CD 2 to the clamp playback unit 5 by the driving force of the motor 13 as mentioned below. When the CD 2 is not clamped, the carriage chassis 45 of the clamp playback unit 5 stays away from the clamp arm 46, while the roller arm 37 of the conveying unit 4 approaches the disc guide 38.

Figure 13:
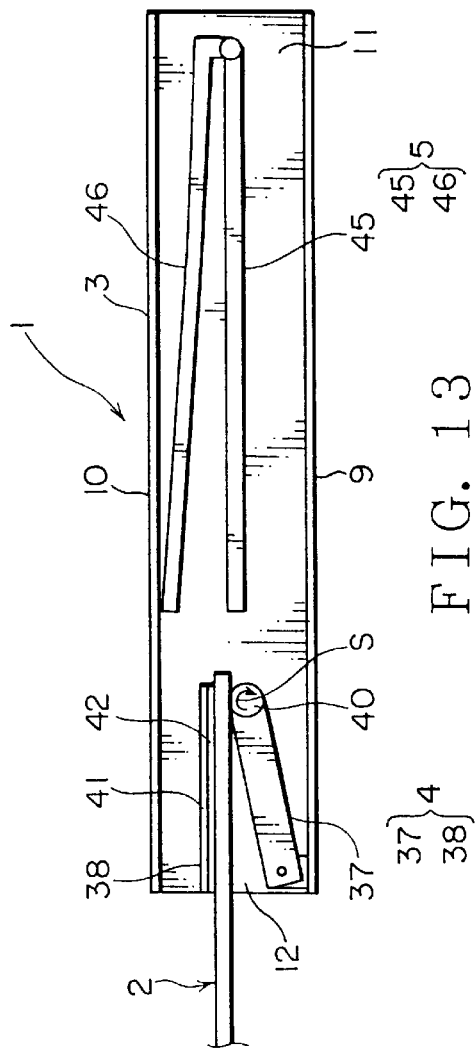
FIG. 13 is a view schematically illustrating a state that a CD is inserted, in the playback mechanism of a recording medium shown in FIG. 1.

First, the CD 2 is inserted into the opening 12 for inserting the recording medium. A roller 40 is rotating in a direction indicated by an arrow S shown in FIG. 13 and the CD 2 is nipped between the roller 40 and a gliding member 42 of the disc guide 38. Since the roller 40 is rotating in the direction indicated by an arrow S, as shown in FIG. 13, the CD 2 is conveyed toward between the carriage chassis 45 and the clamp arm 46.

Figure 14:
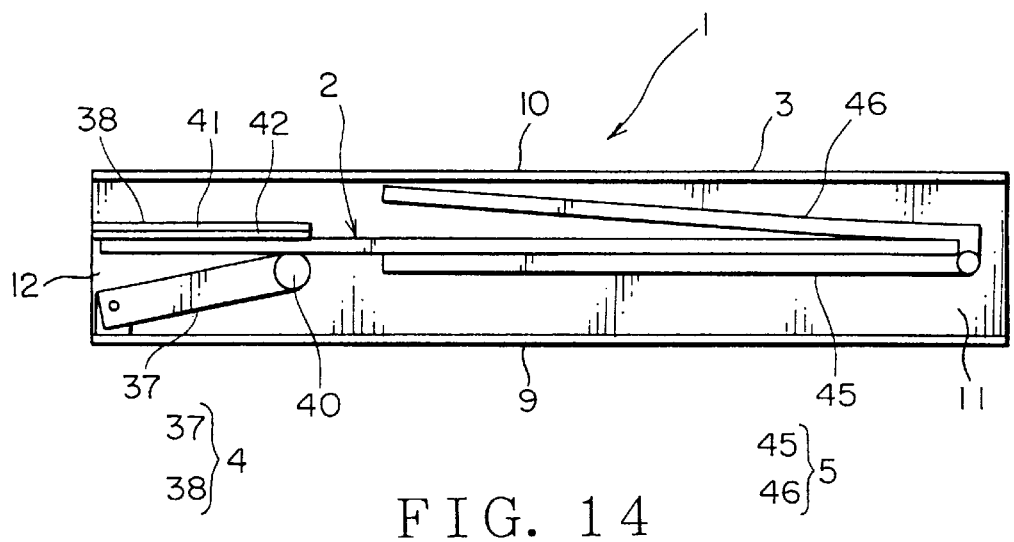
FIG. 14 is a view schematically illustrating a state that the inserted CD is situated between a carriage chassis and a clamp arm, in the playback mechanism of a recording medium shown in FIG. 1.
Figure 15:
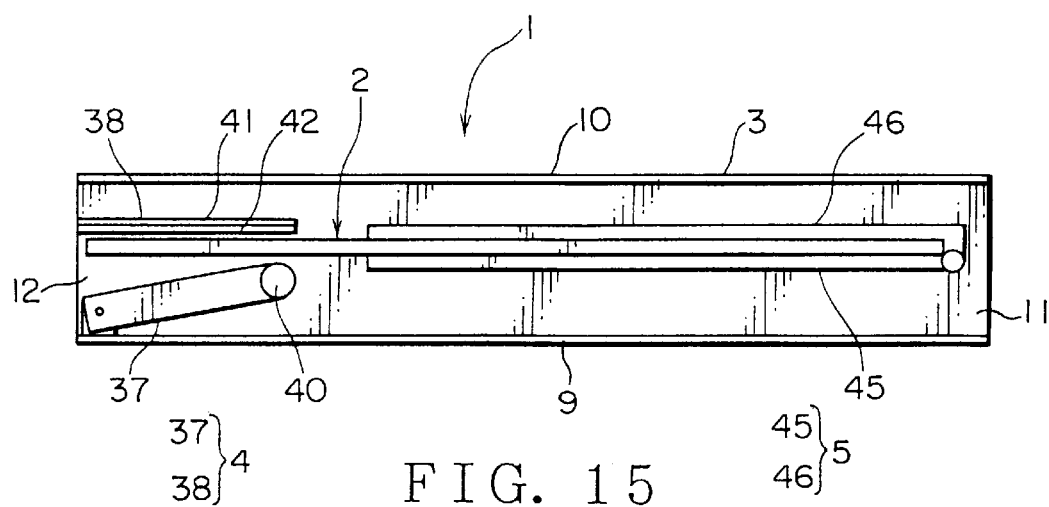
FIG. 15 is a view schematically illustrating a state that the inserted CD is clamped by a clamp playback unit, in the playback mechanism of a recording medium shown in FIG. 1.

Then, as shown in FIG. 14, the CD 2 nipped between the roller 40 and the gliding member 42 is situated between the carriage chassis 45 and the clamp arm 46. Thereafter, the carriage chassis 45 and the clamp arm 46 rotate around the locking pin 52 so as to approach to each other. As shown in FIG. 15, when the carriage chassis 45 and the clamp arm 46 nip the CD 2 therebetween, at the same time the roller arm 37 and the disc guide 38 part from the CD 2.

Figure 16:
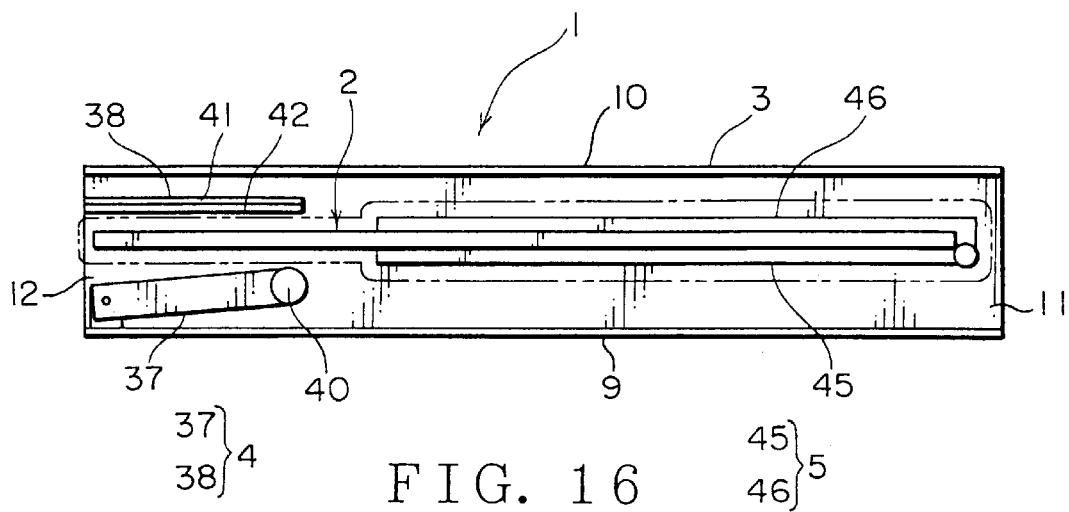
FIG. 16 is a view schematically illustrating a process that a roller arm and a disc guide part from a CD, in the playback mechanism of a recording medium shown in FIG. 1.

Thereafter, the locking member 44 is gradually shifted in such a direction that the locking of the locking pin 52 by the hook 54 is released, while the roller arm 37 shifts in a direction that the roller 40 parts from the CD 2 and the disc guide 38 rises to part from the CD 2. Even when the clamp playback unit 5 moves relatively to the instrument body 3, the locking member 44 rotates so that the clamped CD 2 does not come into contact with the roller arm 37 or the disc guide 38. For example, as shown in FIG. 16, by the rotation of the locking member 44, neither the roller arm 37 nor the disc guide 38 enters into the movable range (an area surrounded by an alternate long and two short dashes line shown in FIG. 16) of the clamp playback unit 5 and so on.

Figure 17:
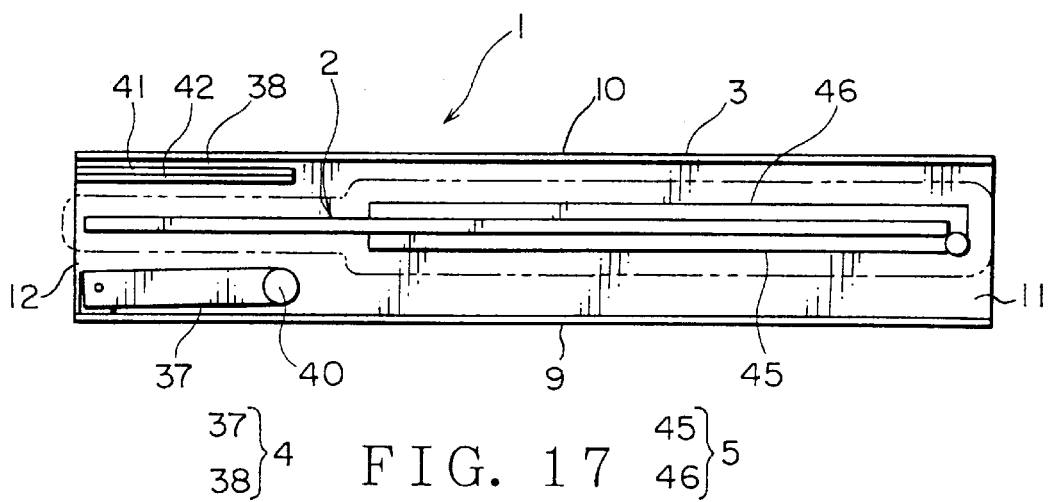
FIG. 17 is a view schematically illustrating a state that a locking member shifts to the lock-releasing position, in the playback mechanism of a recording medium shown in FIG. 1.

Thereafter, the locking member 44 shifts to the lock-releasing position described above. Further, as shown in FIG. 17, the roller arm 37 becomes in parallel to the bottom wall 9 situating at the vicinity of the bottom wall 9, while the disc guide 38 becomes in parallel to the top wall 10 situating at the vicinity of the top wall 10. Thus, each of the roller arm 37 and the disc guide 38 completely parts away from the CD 2.

Even when the clamp playback unit 5, which clamps the CD 2, moves relatively to the instrument body 3, the CD 2 comes into contact with neither the roller arm 37 nor the disc guide 38. For example, as shown in FIG. 17, neither the roller arm 37 nor the disc guide 38 enters into the movable range (an area surrounded by an alternate long and two short dashes line shown in FIG. 17) of the clamp playback unit 5 and so on.

Thus, while the CD 2 is conveyed, the roller arm 37 and the disc guide 38 nip the CD 2 therebetween, while the carriage chassis 45 and the clamp arm 46 stay away from the CD2. When the carriage chassis 45 and the clamp arm 46 nip the CD 2 therebetween and the clamp playback unit 5 clamps the CD 2, the roller arm 37 and the disc guide 38 gradually part from the CD 2. While the roller arm 37 and the disc guide 38 gradually part from the CD 2, the locking member 44 gradually shifts from the locking position to the lock-releasing position.

The sliding member 7 gradually parts the roller arm 37 and the disc guide 38 from the CD 2 to prevent the CD 2 clamped by the clamp playback unit 5 from coming into contact with the roller arm 37 or the disc guide 38. The sliding member 7 gradually shifts the locking member 44 from the locking position to the lock-releasing position.

Figure 6:
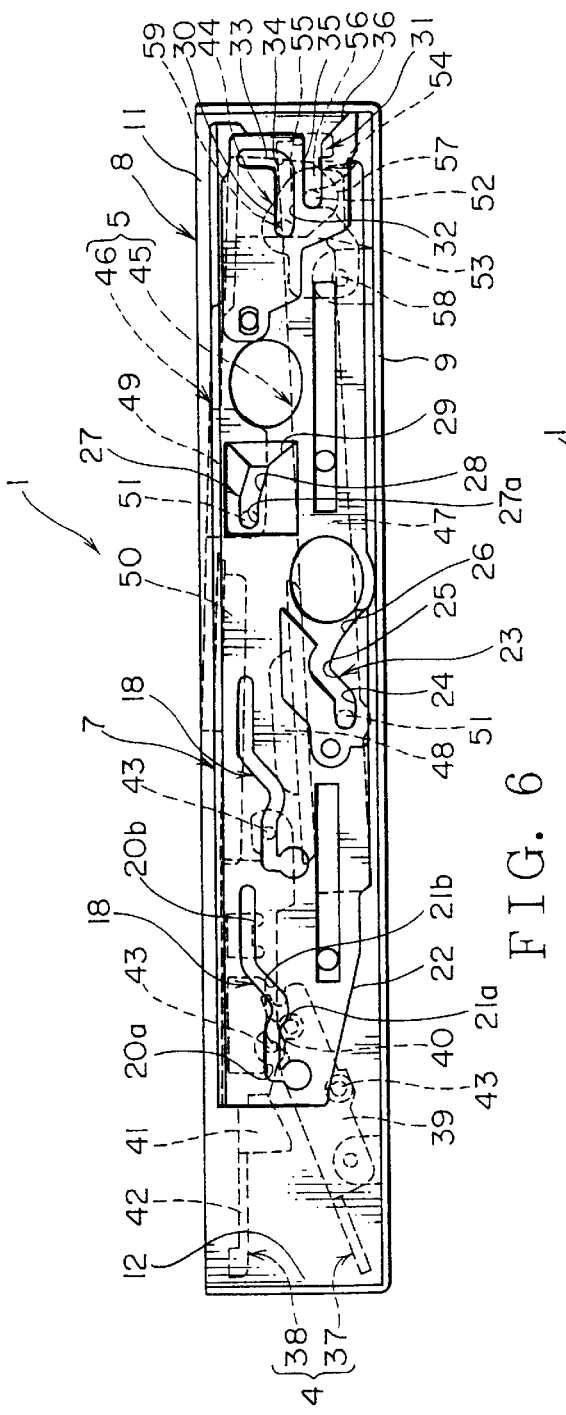
FIG. 6 is a view of the playback mechanism of a recording medium shown in FIG. 1 viewed from a side thereof illustrating a state that a CD is not inserted therein.

In the following, an operation (action) of the playback mechanism 1 of a recording medium constituted as described above will be explained. As shown in FIG. 6, when the CD 2 is not inserted in the instrument body 3, the sliding member 7 stays farthest away from the opening 12 for inserting a recording medium. The first projecting pin 43 of the roller arm 37 comes into contact with an end of the guiding inclined surface 22 near the opening 12. The first projecting pin 43 of the disc guide 38 is situated in the horizontal extending part 20a. Thus, the roller arm 37 and the disc guide 38 stay near each other. The gear attached to the end of the roller 40 of the roller arm 37 engages with the gear 14 of the driving source unit 6.

When the CD 2 is not inserted in the instrument body 3, as shown in FIG. 6, the third projecting pin 51 of the carriage chassis 45 is situated at an end of the horizontal part 24 of the first guiding groove 23 near the opening 12. The third projecting pin 51 of the clamp arm 46 is situated at an end of the horizontal part 27a of the second guiding groove 27 near the opening 12. Thus, the carriage chassis 45 and the clamp arm 46 stay away from each other.

When the CD 2 is not inserted in the instrument body 3, as shown in FIG. 6, the locking pin 52 is situated at an end of the horizontal extending part 35 of the locking concave groove 31 near the opening 12. The hook 54 of the locking member 44 locks the locking pin 52, while the second projecting pin 59 of the locking member 44 is situated at an end of the slide extending part 32 of the locking-guide groove 30 near the opening 12. Thus, the hook 54 locks the locking pin 52 and the locking member 44 fixes the clamp playback unit 5 to the instrument body 3.

When the CD 2 is inserted into the opening 12, the motor 13 rotates in a regular rotational direction thereof and the roller 40 rotates. The CD 2 inserted into the opening 12 is nipped between the disc guide 38 and the roller 40 of the roller arm 37. Since the roller 40 rotates, the CD 2 is conveyed toward the inside of the instrument body 3.

Then, the CD comes into contact with the seesaw member and the seesaw member pushes the rack 15 toward the opening 12. The rack 15 engages with a gear 14 and the sliding member 7 gradually starts to slide toward the opening 12.

The first projecting pin 43 of the roller arm 37 shifts along the guiding inclined surface 22 and gradually approaches the bottom wall 9. The first projecting pin 43 of the disc guide 38 enters into the inclined extending part 21a from the horizontal extending part 20a. The first projecting pin 43 of the disc guide 38 shifts along the inclined extending part 21a and gradually approaches the bottom wall 9. Thus, the disc guide 38 and the roller arm 37 first gradually approach the bottom wall 9.

The third projecting pin 51 of the carriage chassis 45 enters into the upward inclined part 25 by way of the horizontal part 24. Then, the third projecting pin 51 of the carriage chassis 45 gradually approaches the top wall 10 along the upward inclined part 25. The third projecting pin 51 of the clamp arm 46 gradually approaches the bottom wall 9 along the downward inclined part 28 by way of the horizontal part 27a. Thus, the carriage chassis 45 and the clamp arm 46 gradually approach to each other.

Further, the locking pin 52 moves relatively to the sliding member 7 along the horizontal extending part 35. The second projecting pin 59 of the locking member 44 moves relatively to the sliding member 7 along the slide extending part 32 of the locking-guide groove 30. The locking member 44 keeps locking the locking pin 52.

The CD 2 is conveyed into the instrument body 3 and the central hole of the CD 2 is situated between the rotary table 48 and the clamper 50. Then, the first projecting pin 43 of the roller arm 37 shifts along the guiding inclined surface 22 and gradually approaches the bottom wall 9. The first projecting pin 43 of the disc guide 38 enters into the inclined extending part 21b from the inclined extending part 21a. The first projecting pin 43 of the disc guide 38 shifts along the inclined extending part 21b and gradually approaches the top wall 10. Thus, the disc guide 38 and the roller arm 37 part from each other.

The third projecting pin 51 of the carriage chassis 45 gradually approaches the top wall 10 along the upward inclined part 25. The third projecting pin 51 of the clamp arm 46 gradually approaches the bottom wall 9 along the downward inclined part 28. Thus, the carriage chassis 45 and the clamp arm 46 further gradually approach to each other.

When the carriage chassis 45 and the clamp arm 46 further gradually approach to each other, the CD 2 is nipped between the rotary table 48 and the clamper 50, at the same time the roller 40 of the roller arm 37 and the disc guide 38 part from the CD 2. Thus, when the conveying unit 4 releases the CD 2, at the same time the clamp playback unit 5 clamps the CD 2.

Figure 7:
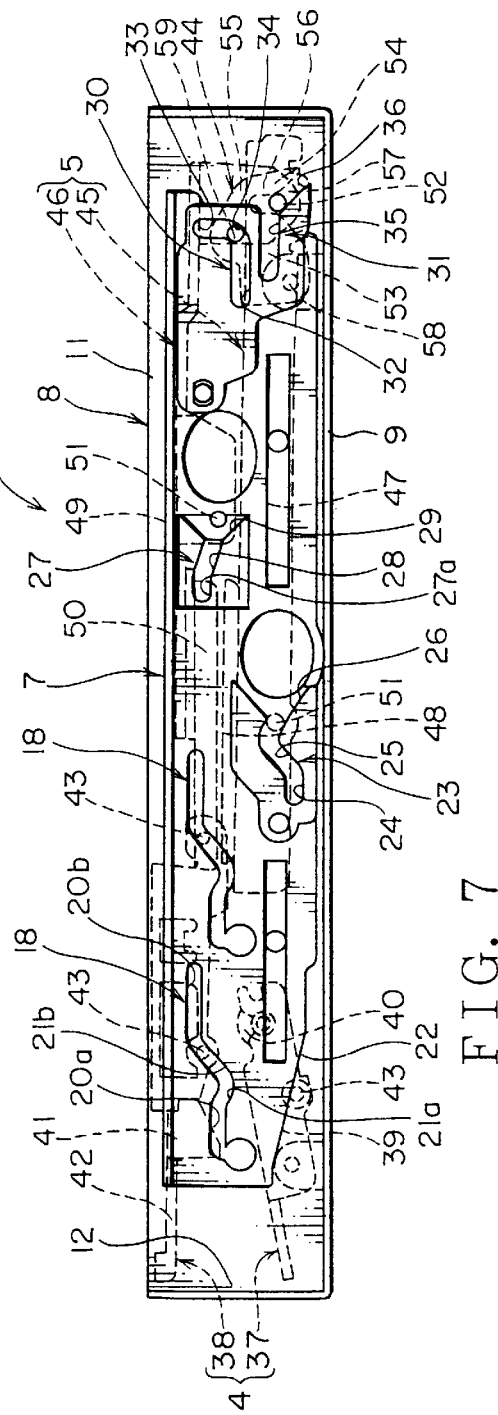
FIG. 7 is a view of the playback mechanism of a recording medium shown in FIG. 1 viewed from a side thereof illustrating a state that a clamp playback unit clamps a CD.

In a state that the clamp playback unit 5 clamps the CD 2, as shown in FIGS. 7 and 9, the first projecting pin 43 of the roller arm 37 comes into contact with the center of the guiding inclined surface 22. The first projecting pin 43 of the disc guide 38 is situated at an upper end of the inclined extending part 21b. Thus, the roller arm 37 and the disc guide 38 gradually part from each other.

In the state that the clamp playback unit 5 clamps the CD 2, as shown in FIGS. 7 and 9, the third projecting pin 51 of the carriage chassis 45 is situated at an end of the upward inclined part 25 of the first guiding groove 23 away from the opening 12. The third projecting pin 51 of the clamp arm 46 is situated in the expanding part 29 of the second guiding groove 27. Thus, the carriage chassis 45 and the clamp arm 46 stay near each other.

In the state that the clamp playback unit 5 clamps the CD 2, as shown in FIGS. 7 and 9, the locking pin 52 is situated in the second expanded part 36 of the locking concave groove 31. The second projecting pin 59 of the locking member 44 is situated at an intersection 34 where the slide extending part 32 of the locking-guide groove 30 intersects the intersection extending part 33. Therefore, the locking member 44 is a little rotated from the locking position in a such direction that the locking of the locking pin 52 by the hook 54 is a little released. Thus, the locking member 44 is a little shifted toward the lock-releasing position from the locking position.

When the motor 13 is rotated in a regular rotational direction and the sliding member 7 is moved toward the opening 12, the projecting pin 43 of the roller arm 37 shifts along the guiding inclined surface 22 and gradually approaches the bottom wall 9. The projecting pin 43 of the disc guide 38 shifts along the inclined extending part 21b, gradually approaches the top wall 10, and thereafter enters into the horizontal extending part 20a. Thus, the disc guide 38 and the roller arm 37 further part away from each other.

The third projection pin 51 of the carriage chassis 45 enters into the expanding part 26 from the upward inclined part 25 and thereafter comes out from the first guiding groove 23. The third projection pin 51 of the clamp arm 46 comes out from the second guiding groove 27. Thus, the carriage chassis 45 and the clamp arm 46 keep staying near each other.

The locking pin 52 comes out from the locking concave groove 31. Since the second projecting pin 59 of the locking member 44 has entered into the intersection extending part 33 of the locking-guide groove 30, the second projecting pin 59 is rotated around the end 58 as the sliding member 7 shifts toward the opening 12. Then, the locking pin 52 completely comes out from the slit 57, thereby the locking of the locking pin 52 by the hook 54 is released. Thus, the locking of the locking pin 52 by the locking member 44 is released and the locking member 44 is shifted to the lock-releasing position shown in FIGS. 8 and 12.

Figure 12:
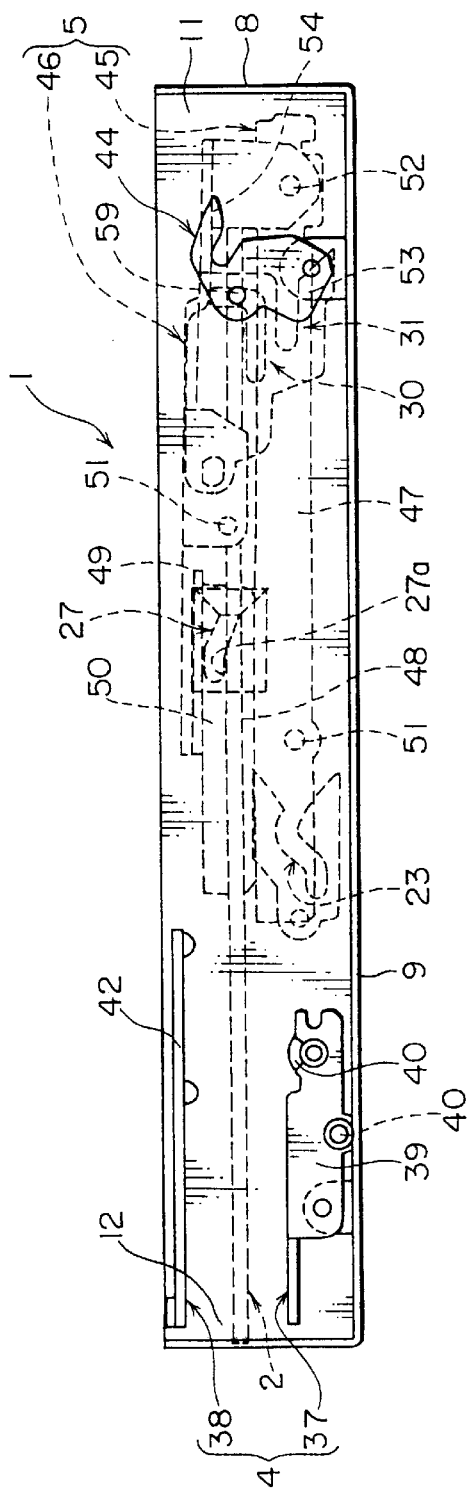
FIG. 12 is another view of the playback mechanism of a recording medium shown in FIG. 1 viewed from a side thereof illustrating a state that a locking member shifts to the lock-releasing position.

As shown in FIGS. 8 and 12, at the lock-releasing position, the first projection pin 43 of the roller arm 37 comes into contact with an end of the guiding inclined surface 22 away from the opening 12. The first projecting pin 43 of the disc guide 38 is situated at an end of the horizontal extending part 20b away from the opening 12. Thus, the roller arm 37 and the disc guide 38 part away from each other. The arm body 39 runs parallel to the bottom wall 9, while the roller arm 37 is situated near the bottom wall 9. The guide body 41 runs parallel to the top wall 10, while the disc guide 38 is situated near the top wall 10.

As shown in FIGS. 8 and 12, at the lock-releasing position, the third projecting pin 51 of the carriage chassis 45 comes out from the first guiding groove 23, while the third projecting pin 51 of the clamp arm 46 comes out from the second guiding groove 27. The locking pin 52 comes out from the locking concave groove 31. The second projection pin 59 of the locking member 44 is situated at the intersection extending part 33 of the locking-guide groove 30. Therefore, after the clamp playback unit 5 clamps the CD 2, the second projecting pin 59 passes through the intersection extending part 33.

Since the locking of the locking pin 52 by the locking member 44 is released, the clamp playback unit 5 is set movable relatively to the instrument body 3 by the clamper (not shown) and the coil spring (not shown) described above. In this state, the playback mechanism 1 of a recording medium reads out the information recorded in the CD 2 and outputs the information as a voice.

When the clamp playback unit 5 shifts from the state of clamping the CD 2 shown in FIGS. 7 and 9 to the lock-releasing position shown in FIGS. 8 and 12, the locking member 44 gradually rotates around the end 58. Then, the locking pin 52 gradually comes out from the locking concave groove 31 and the locking of the locking pin 52 by the locking member 44 is gradually released. Further, each of the roller arm 37 and the disc guide 38 gradually parts away from the CD 2.

While the locking member 44 shifts from the locking position to the lock-releasing position, the locking pin 52 is set movable within a range surrounded by the second expanded part 36, the hook 54 and so on. While the locking member 44 shifts from the locking position to the lock-releasing position, since the locking member 44 rotates around the end 58, the range surrounded by the second expanded part 36, the hook 54 and so on gradually expands.

While the locking member 44 shifts from the locking position to the lock-releasing position, since the sliding member 7 shifts toward the opening 12, The second projecting pin 59 gradually comes out from the first and second guiding grooves 23 and 27. While coming out from the first and second guiding grooves 23 and 27, the third projecting pin 51 becomes movable in the expanding parts 26 and 29. Therefore, while coming out from the first and second guiding grooves 23 and 27, the range, in which the third projecting pin 51 is movable, gradually expands.

Accordingly, while the locking member 44 shifts from the locking position to the lock-releasing position, the range, in which the clamp playback unit 5 is movable relatively to the instrument body 3, gradually expands. However, the sliding member 7 shifts the locking member 44 so that the CD 2 clamped by the clamp playback unit 5, which becomes movable due to the shift of the locking member 44, is prevented from coming into contact with the roller arm 37 of the conveying unit 4 or the disc guide 38, as shown in FIGS. 10A, 10B, 11A and 11B.

Figure 10A:
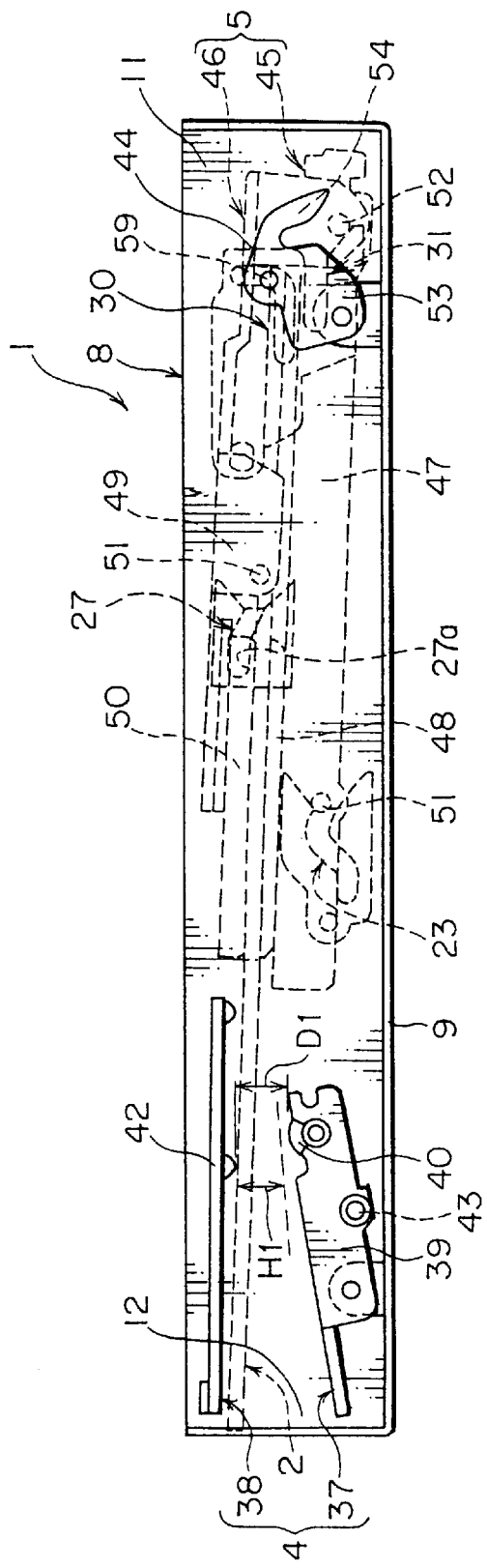
FIGS. 10A and 10B are a view of the playback mechanism of a recording medium shown in FIG. 1 viewed from a side thereof illustrating a process that the locking member shifts from the locking position to the lock-releasing position.
Figure 10B:
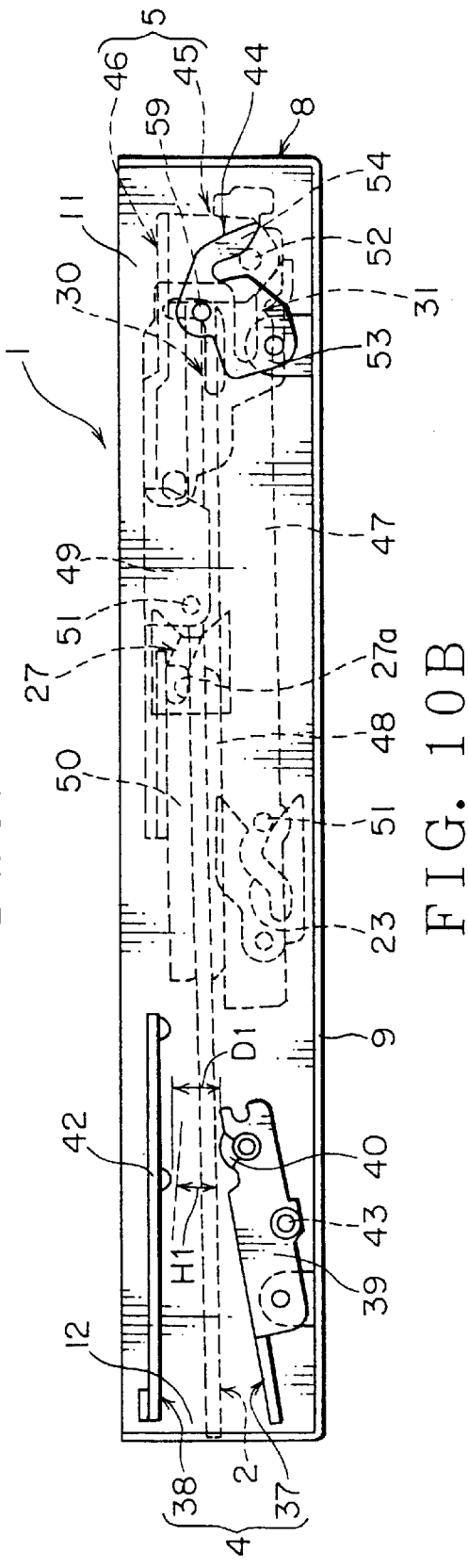

FIGS. 10A and 10B illustrate a state that the sliding member 7 shafts a little toward the opening 12 from a state illustrated in FIG. 9. In FIGS. 10A and 10B, the movable range H1 of the CD 2 is smaller than the distance D1 between the roller arm 37 and the disc guide 38. FIG. 10A illustrates a case that the end of the CD 2 is shifted upward, while FIG. 10B illustrates a case that the end of the CD 2 is shifted downward.

FIGS. 11A and 11B illustrate a state that the sliding member 7 shafts a little toward the opening 12 from a state illustrated in FIG. 10. In FIGS. 11A and 11B, the movable range H2 of the CD 2 is smaller than the distance D2 between the roller arm 37 and the disc guide 38. FIG. 11A illustrates a case that the end of the CD 2 is shifted upward, while FIG. 11B illustrates a case that the end of the CD 2 is shifted downward.

Thus, in the playback mechanism 1 of a recording medium according to the preferred embodiment of the present invention, when the clamp playback unit 5 clamps the CD 2, each of the roller arm 37 of the conveying unit 4 and the disc guide 38 gradually part from the CD 2 and the locking by the locking member 44 is gradually released. When the locking member 44 shifts to the lock-releasing position, the clamp playback unit 5 can read out the information recorded in the CD 2.

In the playback mechanism 1 of a recording medium, when the playback of the CD 2 is finished and the CD 2 is taken out from the instrument body 3, the motor 13 rotates in an opposite direction to shift the sliding member 7 in a direction of parting away from the opening 12.

Then, the locking member 44 gradually rotates from the lock-releasing position to the locking position and the movable range of the clamp playback unit 5 relative to the instrument body 3 gradually narrows. The roller arm 37 and the disc guide 38 gradually approach each other. When the CD 2 is nipped between the roller 40 of the roller arm 37 and the disc guide 38, each of the carriage chassis 45 and the clamp arm 46 parts from the CD 2. The clamp by the clamp playback unit 5 is released. By the rotation of the roller 40, the CD 2 is taken out from the instrument body 3 through the opening 12. Thus, when the CD 2 is taken out from the instrument body 3, as the locking member 44 gradually rotates from the lock-releasing position to the locking position, the movable range of the clamp playback unit 5 narrows, and the roller arm 37 and the disc guide 38 gradually approach each other in response to the narrowing range, thereby nipping the CD 2. Therefore, when the CD 2 is taken out from the instrument body 3, a period of time required for taking the CD 2 out can be shortened.

With the construction according to the preferred embodiment described above, while each of the roller arm 37 and the disc guide 38 parts from the CD 2, the locking member 44 gradually shifts from the locking position to the lock-releasing position. Accordingly, a period of time required until the information recorded in the CD 2 is read out after the CD 2 is inserted in the instrument body 3 can be shortened.

When the sliding member 7 gradually parts each of the roller arm 37 and the disc guide 38 from the CD 2 and the locking member 44 is gradually shifted from the locking position to the lock-releasing position, the CD 2 is prevented from coming into contact with the roller arm 37 and the disc guide 38.

Accordingly, even if the clamp playback unit 5 oscillates relatively to the instrument body 3 due to the oscillation of the vehicle during traveling while the locking member 44 shifts from the locking position to the lock-releasing position, the CD 2 clamped by the clamp playback unit 5 does not come into contact with the roller arm 37 or the disc guide 38.

When the clamp playback unit 5 clamps the CD 2, the first projecting pin 43 is shifted along the guiding hole 18 and the guiding inclined surface 22. Accordingly, when the clamp playback unit 5 clamps the CD 2, each of the roller arm 37 and the disc guide 38 can be securely gradually parted from the CD 2.

When the clamp playback unit 5 clamps the CD 2, the second projecting pin 59 is shifted along the locking-guide groove 30, thereby the locking member 44 is rotated in a direction of releasing the locking of the locking pin 52 by the hook 54. Accordingly, when the clamp playback unit 5 clamps the CD 2, the locking member 44 can be securely gradually shifted from the locking position to the lock-releasing position. Accordingly, a period of time required until the information recorded in the CD 2 is read out after the CD 2 is inserted in the instrument body 3 can be securely shortened.

At the lock-releasing position, the third projecting pin 51 securely comes out from the first and second guiding groove 23 and 27. The locking pin 52 comes out from the locking concave groove 31. Further, the locking of the locking pin 52 by the hook 54 of the locking member 44 is released. Accordingly, at the lock-releasing position, the clamp playback unit 5 can be securely set movable relatively to the instrument body 3.

The locking concave groove 31 extends along the sliding direction of the sliding member 7 and at the locking position the hook 54 of the locking member 44 extends along a direction intersecting the sliding direction of the sliding member 7. Accordingly, at the locking position, the clamp playback unit 5 can be securely fixed to the instrument body 3.

While the conveying unit 4 conveys the CD 2, the second projection pin 59 is situated in the slide extending part 32 of the locking-guide groove 30. Accordingly, while the conveying unit 4 conveys the CD 2, the locking member 44 maintains a state that the hook 54 locks the locking pin 52.

Then, when the clamp playback unit 5 clamps the CD 2, the second projecting pin 59 is situated at the intersection 34. Further, when each of the roller arm 37 and the disc guide 38 gradually parts from the CD 2, the second projecting pin 59 passes through the intersection extending part 33. Accordingly, when the clamp playback unit 5 clamps the CD 2 and each of the roller arm 37 and the disc guide 38 gradually parts from the CD 2, the locking member 44 securely rotates in a direction of releasing the locking of the locking pin 52 by the hook 54.

Consequently, while the CD 2 is conveyed, the clamp playback unit 5 can be securely fixed relatively to the instrument body 3. Accordingly, the CD 2 can be securely prevented from coming into contact with the instrument body 3 and so on while the CD 2 is conveyed.

When the clamp playback unit 5 clamps the CD 2, the locking member 44 is gradually rotated in a direction of releasing the locking of the locking pin 52 by the hook 54. Accordingly, when the clamp playback unit 5 clamps the CD 2, the locking member 44 is gradually shifted from the locking position to the lock-releasing position. Accordingly, a period of time required until the information recorded in the CD 2 is read out after the CD 2 is inserted in the instrument body 3 can be more securely shortened.

In the preferred embodiment described above, the clamp playback unit 5 as the clamp playback device, which clamps the CD 2 as a recording medium from upward and downward direction, is explained. However, the present invention is not limited to the construction described above. Instead, for example, the present invention also can be applied to a clamp playback unit 5, in which the CD 2 is clamped by using a projecting claw formed on the rotary table 48 from the central hole of the CD 2. In this case, the CD 2, which is conveyed by the roller arm 37 and the disc guide 38 as the pair of the nipping devices, is clamped by the claw projecting from the central hole of the CD 2, and each of the roller arm 37 and the disc guide 38 parts from the clamped CD 2.

Incidentally, the contents of Japanese Patent Application No. 2001-130744 are hereby incorporated by reference.

What is claimed is:

1. A playback mechanism of a recording medium comprising:

a pair of nipping devices for nipping the recording medium and conveying the recording medium into an instrument body;

a clamp playback device for clamping the recording medium conveyed into the instrument body and reading out information recorded in the recording medium;

a locking device for locking the clamp playback device relatively to the instrument body, the locking device being movable within a range between a locking position where the clamp playback device is fixed relatively to the instrument body and a lock-releasing position where the clamp playback device is movable relatively to the instrument body; and a cooperation device for gradually parting each of the pair of the nipping devices from the recording medium when the clamp playback device clamps the recording medium conveyed by the pair of the nipping devices, and for gradually shifting the locking device from the locking position to the lock-releasing position so that the clamp playback device becomes movable relatively to the instrument body in response to a movable range of the recording medium, the movable range being formed due to that each of the pair of the nipping devices gradually parts from the recording medium.

2. The playback mechanism of a recording medium according to claim 1, wherein the locking device comprises:

a locking pin provided at the clamp playback device; and a locking member provided in the instrument body for locking the locking pin, the cooperation device comprises:

a sliding member slidably provided in the instrument body;

a first projecting pin provided at each of the pair of the nipping devices; and a second projecting pin provided at the locking member, and the sliding member comprises:

a guiding hole for receiving the first projecting pin of one nipping device out of the pair of the nipping devices;

a guiding inclined surface coming into contact with the first projecting pin of an opposite nipping device out of the pair of the nipping devices; and a locking-guide groove for receiving the second projecting pin, wherein when the sliding member slidably moves relatively to the instrument body, each of the first projecting pins moves along the guiding hole and the guiding inclined surface, each of the pair of the nipping devices gradually parts from the recording medium, and the second projecting pin moves along the locking-guide groove in response to the movement of the first projecting pins, thereby the locking of the locking pin by the locking member is gradually released.

3. The playback mechanism of a recording medium according to claim 2, wherein the locking device further comprises a locking concave groove provided at the sliding member for receiving the locking pin, and the cooperation device further comprises a third projecting pin provided at the clamp playback device, the sliding member further comprises a guiding groove for receiving the third projecting pin, and the guiding groove has a first expanding part, an area of which gradually expands in the sliding direction of the sliding member, while the locking concave groove has a second expanding part, an area of which gradually expands in the sliding direction of the sliding member, as the sliding member slidably moves relatively to the instrument body and the locking of the locking pin by the locking member is gradually released, a movable range of the locking pin within an area defined by the second expanding part and the locking member is gradually expanded while a movable range of the third projecting pin within an area of the first expanding part is gradually expanded, thereby a movable range of the clamp playback device relative to the instrument body is gradually expanded.

4. The playback mechanism of a recording medium according to claim 3, wherein at the lock-releasing position, the third projecting pin and the locking pin come out from the first expanding part of the guiding groove and the second expanding part of the locking concave groove, respectively, and the locking of the locking pin by the locking member is completely released.

5. The playback mechanism of a recording medium according to claim 2, 3 or 4, wherein the locking member includes a hook for locking the locking pin and the hook extends in a direction intersecting the sliding direction of the sliding member at the locking position.

6. The playback mechanism of a recording medium according to claim 5, wherein the locking-guide groove includes a slide extending part extending in the sliding direction of the sliding member and an intersection extending part extending in the direction intersecting the sliding direction of the sliding member, the second projecting pin is situated at the slide extending part while the pair of the nipping devices conveys the recording medium and situated at an intersection where the slide extending part and the intersection extending part intersect each other when the clamp playback device clamps the recording medium, and the locking device shifts from the locking position to the lock-releasing position passing through the inside of the intersection extending part when each of the pair of the nipping devices gradually parts from the recording medium.

7. The playback mechanism of a recording medium according to claim 2, 3, or 4, wherein the locking-guide groove includes a slide extending part extending in the sliding direction of the sliding member and an intersection extending part extending in the direction intersecting the sliding direction of the sliding member, the second projecting pin is situated at the slide extending part while the pair of the nipping devices conveys the recording medium and situated at an intersection where the slide extending part and the intersection extending part intersect each other when the clamp playback device clamps the recording medium, and the locking device shifts from the locking position to the lock-releasing position passing through the inside of the intersection extending part when each of the pair of the nipping devices gradually parts from the recording medium.

\* \* \* \* \*